United States Patent [19]

Leone et al.

[11] Patent Number: 5,069,852
[45] Date of Patent: Dec. 3, 1991

[54] METHOD AND DEVICE FOR THE MANUFACTURE OF A SEALING GASKET ON THE RIM OF A SHEET OF GLASS

[75] Inventors: Massimo Leone; Ciro Paudice, both of Vasto, Italy

[73] Assignee: Societá Italiana Vetro - SIV - S.p.A., San Salvo CH, Italy

[21] Appl. No.: 433,204

[22] Filed: Nov. 8, 1989

[30] Foreign Application Priority Data

Nov. 9, 1988 [IT] Italy ................................ 48540 A/88

[51] Int. Cl.[5] ............................................. B29C 47/02
[52] U.S. Cl. ................................. 264/171; 264/177.2; 264/252; 264/263; 264/271.1
[58] Field of Search ............ 264/149, 252, 263, 271.1, 264/171, 177.2

[56] References Cited

U.S. PATENT DOCUMENTS

| | | | |
|---|---|---|---|
| 3,381,340 | 5/1968 | Chapin, Jr. ........................ | 264/252 |
| 3,872,198 | 3/1975 | Britton ................................ | 264/46.6 |
| 4,249,517 | 2/1981 | Schroeder et al. ................ | 264/46.9 |
| 4,387,923 | 6/1983 | Choby et al. ....................... | 296/201 |
| 4,554,123 | 11/1985 | Smyth ................................ | 425/113 |
| 4,561,625 | 12/1985 | Weaver .............................. | 425/116 |
| 4,571,278 | 2/1986 | Kunert ............................... | 264/259 |
| 4,576,773 | 3/1986 | Azzola et al. ...................... | 264/171 |
| 4,584,155 | 4/1986 | Zanella .............................. | 264/252 |
| 4,618,322 | 10/1986 | Lagasse ............................. | 425/129 R |
| 4,629,648 | 12/1986 | Minick et al. ..................... | 264/176.1 |
| 4,662,113 | 5/1987 | Weaver .............................. | 264/252 |
| 4,826,417 | 5/1989 | Reilly et al. ....................... | 425/127 |
| 4,830,804 | 5/1989 | Weaver .............................. | 264/252 |
| 4,982,486 | 1/1991 | Otagawa et al. .................. | 264/177.2 |

FOREIGN PATENT DOCUMENTS

| | | |
|---|---|---|
| 3435365 | 4/1985 | Fed. Rep. of Germany . |
| 57-1737 | 1/1982 | Japan . |
| 63-45012 | 2/1988 | Japan . |
| 63-89316 | 4/1988 | Japan . |
| 63-162210 | 7/1988 | Japan . |
| WO88/03863 | 6/1988 | PCT Int'l Appl. ................. 264/252 |

*Primary Examiner*—Robert A. Dawson
*Assistant Examiner*—Allan R. Kuhns
*Attorney, Agent, or Firm*—Wenderoth, Lind & Ponack

[57] ABSTRACT

A method of manufacturing a sealing gasket on the rim of a sheet of glass has a preformed sealing gasket fixed to the rim of a glass. Polymerization is carried on in situ with a polyurethane material in a modified mold in which the preformed sealing gasket is positioned. The preformed sealing gasket also forms a sealing junction to avoid leakage of the polymer material.

2 Claims, 1 Drawing Sheet

METHOD AND DEVICE FOR THE MANUFACTURE OF A SEALING GASKET ON THE RIM OF A SHEET OF GLASS

BACKGROUND OF THE INVENTION

1. Field of the Invention

The present invention relates to a method and a device for the manufacture of a sealing gasket on the rim of a sheet of glass, particularly of a sheet of glass to be used as glazing on a vehicle or a fixed installation.

The method is well known of manufacturing a sealing gasket for a sheet of glass directly on the outer rim of the glass.

2. Description of the Prior Art

Italian patent 1178437 in particular describes a process comprising the step of injecting a thermosetting polyurethane material into the cavity of a mold placed all around the rim of the sheet of glass to be provided with a sealing gasket. The injected polyurethane material polymerizes at predetermined temperature and pressure conditions and adheres to the rim of the glass thus taking the shape of the cavity into which it was injected.

Italian patent 1178177 describes a mold for carrying out the process according to the above mentioned patent. The mold comprises two portions complementary one to the other, which, on closing one on the other, define a cavity to receive the polyurethane material, injected through a hole. A sealing junction placed in a predetermined position in each of the mold portion and around the cavity is used to prevent the injected material from pouring onto the glass surface.

By means of the above mentioned process it is possible to manufacture in one step the entire sealing gasket on a sheet of glass, the sealing gasket serving the purpose of supporting and sealing the glass on the structure to which it is assembled, as well as aesthetically merging the glass surface into the same structure.

The above mentioned known prior art shows, however, some disadvantages.

The polyurethane material forming the sealing gasket does not withstand weathering satisfactorily, so that the strip surface which, after assembling, is in contact with the outer environment, tends to degrade. Consequently a further operation after injection and polymerization is provided, which consists in painting the exposed surface with an opaque paint.

The two complementary half-molds have to be provided with a sealing junction in the areas in which they are in contact with the glass. These sealing junctions are subjected to wear and to damage, so that they have to be replaced from time to time.

Since the half-mold forming the outer part of the sealing gasket should provide the gasket with a particular finishing and precision working, and thus also has an aesthetic function, such a half-mold has to be carefully cleaned after each cycle of molding to prevent unacceptable surface defects.

The inner surface of both half-molds should be treated regularly with anti-adhesive products to avoid, during the molding, portions of the sealing gasket remaining glued to the mold, which would result in a production of waste and further loss of time for the cleaning of the mold.

Summary of the Invention

An object of the present invention is to provide a method of manufacture of a sealing gasket resistant to weathering, thus avoiding the painting operation and also eliminating the need to clean the lower half-mold after each working cycle.

A further object of the present invention is to reduce the use of an anti-glueing substance.

An additional object of the present invention is to provide a device in which replacement of the sealing junction is eliminated in one of the two half-molds.

Last but not least, an object of the present invention is to provide a method of easy and cheap performance.

According to this process the operation for the manufacture of the sealing gasket is divided into two parts. In the first part a sealing gasket is produced having characteristics such as to make it adapted to be used in the outside environment. In the second part the operation is carried out by application in situ of the polyurethane material, the prefabricated sealing gasket then being sealed to the glass.

Accordingly, the object of the present invention is a method for the manufacture of a sealing gasket on the rim of a sheet of glass in which a polyurethane material is introduced into a molding cavity under suitable temperature and pressure conditions to carry out a polymerization of the material, comprising introducing the material into a cavity formed by the rim of sheet of glass and a preformed sealing gasket, so that the polymerized urethane material adheres to the glass and the preformed sealing gasket.

A further object of the present invention is a device for the manufacture of a sealing gasket on the rim of a sheet of glass to carry out the above method, including a molding unit formed by two half-molds which define a molding cavity therebetween, comprising a preformed sealing gasket housed in the cavity, having an edge surface in sealing contact with the glass during the introduction of the polyurethane material.

DESCRIPTION OF THE FIGURE

The invention is illustrated in further detail hereinafter with reference to the accompanying FIGURE, which represents an illustrative embodiment thereof.

DESCRIPTION OF THE PREFERRED EMBODIMENTS

Figure 1:
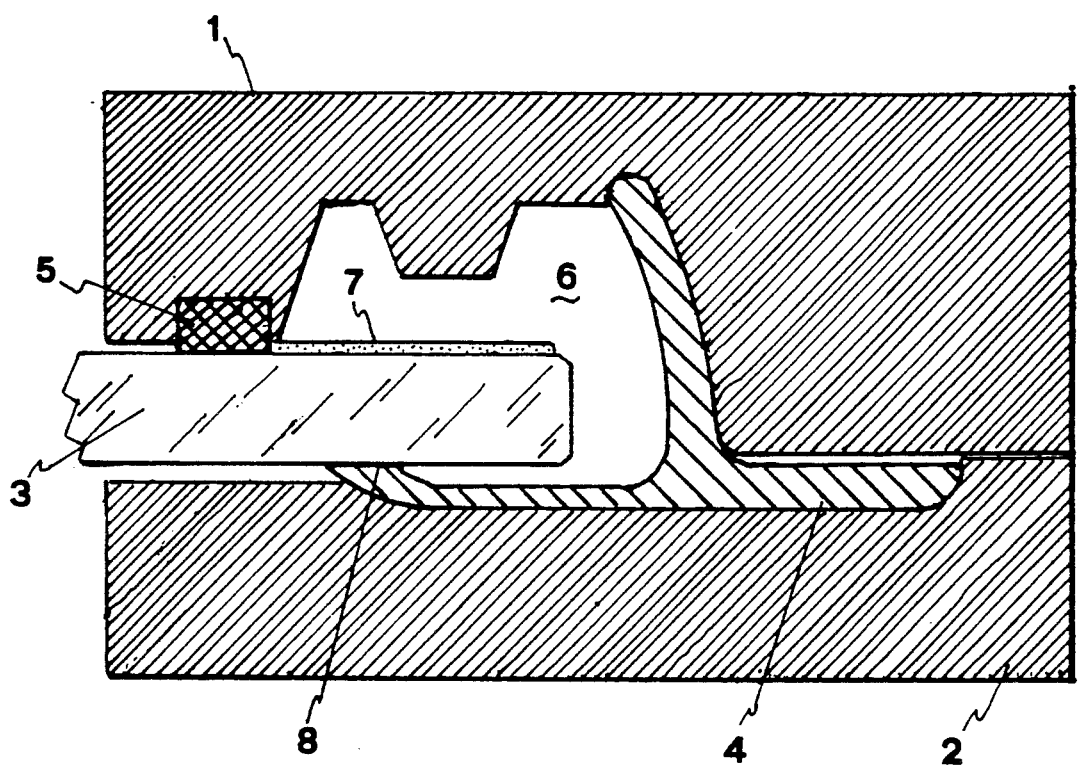
FIG. 1 is a cross section along a vertical plane of the main body of a mold unit in which the process according to the invention is carried out.

The drawing shows a unit formed with two complementary molds, in which mold 1 is closed on mold 2, thus forming a cavity 6.

The sheet of glass 3, around a rim of which the polyurethane material has to be injected, is supported by a fixture not shown in the drawing A sealing gasket 5 is inserted in a housing provided in the mold 1 and ensures the system being sealed with respect to the polyurethane material leaking towards the upper surface of the glass.

The sheet of glass 3 is previously coated on a peripheral strip with an opaque layer 7 also containing a chemical bridge substance enhancing the adhesion of glass and polyurethane material.

According to the present invention, in the mold 2 a sealing gasket 4 is housed along the whole periphery of the glass 3, which is preformed and made of a material compatible with polyurethane and at the same time treated so as to be resistant to weathering. The sealing gasket 4 remains exposed to the outside environment after the glass has been assembled on the structure of its destination.

The sealing gasket 4 adheres to the glass 3 in correspondence with the surface 8, thus affecting a sealing action on the glass surface.

The manufacture of the sealing gasket according to the present invention comprises two successive steps. The first step is the manufacture of the sealing gasket 4 to be exposed to the outside environment. The second step is the injection of polyurethane between the preformed sealing gasket 4 and the glass 3, carried out so that the glass 3 and the sealing gasket 4 are sealed by a seam of polymer material which takes the same size and shape as the cavity 6.

In this way the aesthetic function, as well as the function of resistance to weathering, are accomplished by the prefabricated sealing gasket 4, with no need of a further painting step. Moreover, the mold 2 will result in being particularly inexpensive, in that a sealing junction is not required, since this function is accomplished by the same preformed sealing gasket 4. In addition to this the mold 2 no longer requires an antiglueing treatment, since it will only come in contact only with the preformed sealing gasket 4, which can be provided chemically inert with respect to the mold. A further advantage is that as the mold is not subject to any flow of the molding material, it will not be excessively worn and can thus be made of a less expensive material.

The invention as above described is liable to be carried out in different embodiments, all falling within the scope of the inventive concept, and moreover every detail can be replaced by others technically equivalent.

In a modification of the present invention, the injecting operation of the polyurethane material can be substituted by an extrusion operation of the same material along the rim of the glass.

The mold 2 in this case supports the prefabricated sealing gasket, and the mold 1 is substituted by an extrusion nozzle having the same configuration as mold 1. The nozzle, upon horizontally sliding along the mold 2 along the edge of the glass will deposit on the sealing gasket 4 and the glass 3, a seam of polyurethane material having the same cross-section as the cavity 6, due to the nozzle having the same configuration as the mold 1, and thereby embedding the edge of the glass sheet which projects into the cavity This material is polymerized and set by air humidity, sealing the glass 3 and sealing gasket 4 one to the other.

This modification can be advantageously used in order to apply a sealing gasket having a particular shape.

We claim:

1. A method for the manufacture of a sealing gasket on the edge of a fixed glazing of a vehicle having a surface to be exposed to the outside environment, comprising:

providing a prefabricated sealing gasket made from a material compatible with polyurethane and adapted to be exposed to the outside environment, said sealing gasket having a surface to be exposed to the outside environment on one side and an inner surface on the other side, said inner surface including a sealing edge the surface of which is capable of sealing on the surface of said sheet of glass;

placing said prefabricated sealing gasket in a half-mold such that said inner surface of the prefabricated sealing gasket defines a surface of a molding cavity;

placing an edge of said sheet of glass in contact with said prefabricated sealing gasket at said sealing edge thereof, such that said edge of said sheet of glass projects into said molding cavity and additionally defines said molding cavity together with said inner surface of the prefabricated sealing gasket; and extruding a polymerizable polyurethane material on said molding cavity under polymerizing conditions from an extrusion nozzle, said extrusion nozzle sliding along said molding cavity and having a cross-sectional configuration such as to provide a seam of a desired cross-sectional shape to obtain a finished sealing gasket comprising said prefabricated sealing gasket and said seam of polymerized polyurethane material, said seam being bonded to said prefabricated sealing gasket and to said sheet of glass, and said seam embedding the projecting edge of said sheet of glass.

2. A method as set forth in claim 1, in which the surface of said edge of said sheet of glass to be bonded to said polyurethane material is coated with an opaque layer.

* * * * *